United States Patent
Miyazaki et al.

(10) Patent No.: US 11,207,924 B2
(45) Date of Patent: Dec. 28, 2021

(54) PNEUMATIC TIRE

(71) Applicant: Toyo Tire Corporation, Itami (JP)

(72) Inventors: Tetsuji Miyazaki, Itami (JP); Yoshiki Sato, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 99 days.

(21) Appl. No.: 16/393,037

(22) Filed: Apr. 24, 2019

(65) Prior Publication Data
US 2019/0351712 A1  Nov. 21, 2019

(30) Foreign Application Priority Data
May 18, 2018 (JP) .............................. JP2018-096145

(51) Int. Cl.
*B60C 11/13* (2006.01)
*B60C 11/04* (2006.01)
(Continued)

(52) U.S. Cl.
CPC .......... *B60C 11/042* (2013.01); *B60C 11/032* (2013.01); *B60C 11/0304* (2013.01);
(Continued)

(58) Field of Classification Search
CPC . B60C 11/032; B60C 11/042; B60C 11/0304; B60C 1/1353; B60C 2011/0344;
(Continued)

(56) References Cited

U.S. PATENT DOCUMENTS 9,333,810 B2 * 5/2016 Emorine ............. B60C 11/1281
2012/0247631 A1  10/2012 Rooney
(Continued)

FOREIGN PATENT DOCUMENTS

CN       103287220 A      9/2013
DE    102012101817 A1 *  9/2013   ......... B60C 11/1315
(Continued)

OTHER PUBLICATIONS

Machine translation of WO-2017022308-A1, Shibai Takashi (Year: 2017).*
(Continued)

*Primary Examiner* — Robert C Dye
(74) *Attorney, Agent, or Firm* — Westerman, Hattori, Daniels & Adrian, LLP

(57) ABSTRACT

A rib-like land section partitioned by main grooves, a plurality of sub-grooves provided in the rib-like land section at intervals in the tire circumferential direction and a groove hole provided between the sub-grooves adjacent to each other and extending in the tire circumferential direction are provided in a tread section. The sub-groove includes a lateral groove portion, in which one end opens to the main groove and the other end terminates inside the rib-like land section, and a longitudinal groove portion extending from the other end of the lateral groove portion to one side in the tire circumferential direction and terminating inside the rib-like land section. The groove hole is formed so that a groove depth at one end part close to a terminal end of the longitudinal groove portion becomes shallower than a groove depth at the other end part far from the terminal end.

2 Claims, 3 Drawing Sheets

(51) Int. Cl.
  *B60C 11/03* (2006.01)
  *B60C 11/24* (2006.01)
(52) U.S. Cl.
  CPC .......... *B60C 11/1353* (2013.01); *B60C 11/24* (2013.01); *B60C 2011/0344* (2013.01); *B60C 2011/0358* (2013.01); *B60C 2011/0381* (2013.01); *B60C 2011/1361* (2013.01)
(58) Field of Classification Search
  CPC ..... B60C 2011/0358; B60C 2011/0381; B60C 2011/1361; B60C 11/24
  See application file for complete search history.

(56) References Cited

U.S. PATENT DOCUMENTS

| | | |
|---|---|---|
| 2013/0228255 A1 | 9/2013 | Sato |
| 2018/0194173 A1* | 7/2018 | Shibai ................. B60C 11/0302 |
| 2018/0207996 A1* | 7/2018 | Serva ...................... B60C 11/04 |
| 2019/0030957 A1 | 1/2019 | Shibai |

FOREIGN PATENT DOCUMENTS

| | | | | |
|---|---|---|---|---|
| DE | 102012108384 A1 * | 3/2014 | ............. | B60C 11/13 |
| JP | 2002052908 A * | 2/2002 | ............... | G01B 5/18 |
| JP | 2007-237805 A | 9/2007 | | |
| JP | 2009-137412 A | 6/2009 | | |
| JP | 2011-102080 A | 5/2011 | | |
| JP | 2011-201337 A | 10/2011 | | |
| JP | 2016-159827 A | 9/2016 | | |
| JP | 2016159827 A * | 9/2016 | | |
| WO | WO-2017022308 A1 * | 2/2017 | ......... | B60C 11/0306 |
| WO | 2017/126375 A1 | 7/2017 | | |

OTHER PUBLICATIONS

Machine translation of JP-2016-159827-A, Sudo Hiroki (Year: 2019).*
Machine translation of DE-102012101817-A1, Behr Ulrich (Year: 2013).*
Machine translation of JP-2002052908-A, Shimura Kazuhiro (Year: 2002).*
Machine translation of DE-102012108384-A1, Behr Ulrich (Year: 2014).*
Sudo, JP2016159827A Machine Translation (Year: 2016).*
Behr DE102012101817A1 Machine Translation (Year: 2013).*
Office Action dated Jun. 10, 2021, issued in counterpart CN Application No. 201910210745.3, with English Translation. (11 pages).
Office Action dated Jun. 8, 2021, issued in counterpart DE Application No. 10 2019 206 321.7, with English Translation. (8 pages).

* cited by examiner

PNEUMATIC TIRE

CROSS-REFERENCE TO RELATED APPLICATIONS

This application is based upon and claims the benefit of priority from the prior Japanese Patent Application No. 2018-96145, filed on May 18, 2018; the entire contents of which are incorporated herein by reference.

BACKGROUND

1. Technical Field

An embodiment of the present invention relates to a pneumatic tire.

2. Related Art

There is known in related art a pneumatic tire provided with a plurality of sub-grooves with an L-shape in plan view in a rib-like land section partitioned by main grooves and extending in the tire circumferential direction at intervals in the tire circumferential direction, in which each sub-groove has a lateral groove portion extending in a tire width direction and opening to a main groove and a longitudinal groove portion extending from one end of the lateral groove portion in a tire circumferential direction and terminating inside the rib-like land section (for example, refer to JP-A-2011-102080 (Patent Literature 1), JP-A-2009-137412 (Patent Literature 2) and JP-A-2007-237805 (Patent Literature 3).

In these pneumatic tires, the above sub-grooves function as resonators reducing columnar resonance sound caused by the main grooves extending in the tire circumferential direction to thereby reduce tire noise.

In the case where the plural sub-grooves with the L-shape in plan view are provided at intervals in the tire circumferential direction, heel-and-toe wear as an uneven wear in which the wear amount differs in a step-in side and a kick-out side may occur in a land section part sandwiched between the sub-grooves. That is, in the land section part sandwiched between the sub-grooves, one end part in the tire circumferential direction where the longitudinal groove portion of the sub-groove extends has smaller rigidity than the other end part where the longitudinal groove portion does not extend. As the difference in rigidity is large at both end portions as described above, the heel-and-toe wear tends to occur while the tire is rotated.

SUMMARY

In view of the above, an object of an embodiment of the present invention is to provide a pneumatic tire capable of reducing heel-and-toe wear while reducing columnar resonance sound.

A pneumatic tire according to an embodiment of the present invention includes a main groove provided in a tread section and extending in a tire circumferential direction, a rib-like land section partitioned by the main groove and extending in the tire circumferential direction, a plurality of sub-grooves provided in the rib-like land section at intervals in the tire circumferential direction and a groove hole provided between the sub-grooves adjacent to each other in the tire circumferential direction and extending in the tire circumferential direction. The sub-groove includes a lateral groove portion extending in a tire width direction, in which one end opens to the main groove and the other end terminates inside the rib-like land section, and a longitudinal groove portion extending from the other end of the lateral groove portion to one side in the tire circumferential direction and terminating inside the rib-like land section. The groove hole is formed so that a groove depth at one end part close to a terminal end of the longitudinal groove portion becomes shallower than a groove depth at the other end part far from the terminal end.

According to the embodiment, the sub-grooves each including the lateral groove portion opening to the main groove and extending in the tire width direction and the longitudinal groove portion communicating with the lateral groove portion and extending in the tire circumferential direction are provided, thereby reducing columnar resonance sound of the tire. Moreover, the groove hole extending in the tire circumferential direction is provided between the sub-grooves adjacent each other in the tire circumferential direction, and the groove depth of the groove hole is formed so as to be shallower on the side close to the terminal end of the longitudinal groove portion, thereby reducing the difference in rigidity caused by extension of the longitudinal groove portion, as a result, heel-and-toe wear can be reduced.

DESCRIPTION OF EMBODIMENTS

Hereinafter, an embodiment will be explained with reference to the drawings.

A pneumatic tire according to an embodiment includes a right and left pair of bead sections, a right and left pair of side wall sections and a tread section provided between both side wall sections so as to connect a radial-direction outer end portions of the right and left side wall sections, which can adopt a common tire structure except for a tread pattern.

Figure 1:
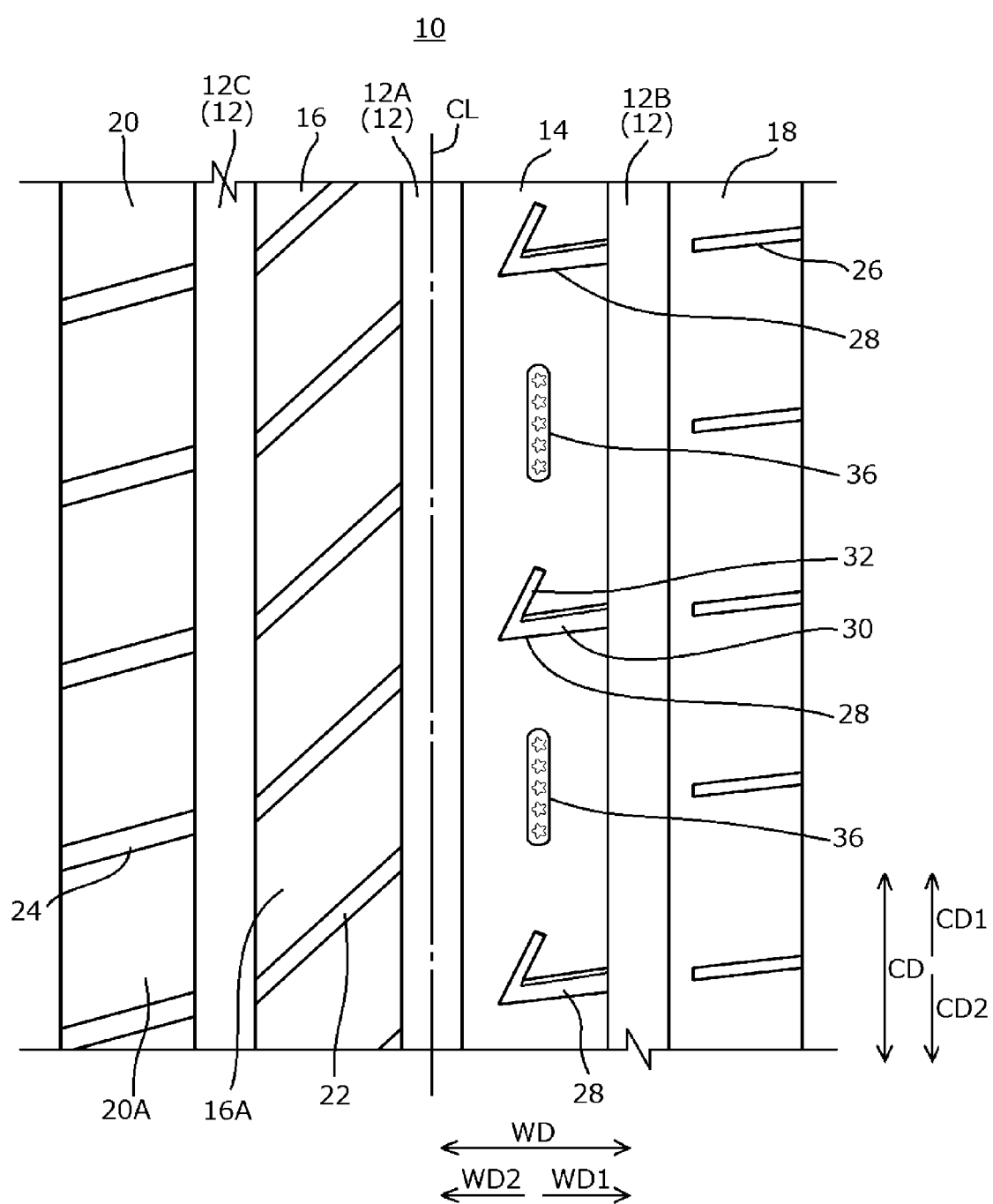
FIG. 1 is a developed view showing a tread pattern of a pneumatic tire according to an embodiment.

As shown in FIG. 1, a plurality of main grooves 12, three grooves in this example, are provided as circumferential grooves extending in a tire circumferential direction CD on a tread surface of a tread section 10 at intervals in a tire width direction WD. The main grooves 12 are a center main groove 12A provided on a tire equator CL, a first shoulder main groove 12B provided on one side (right side in FIG. 1) WD1 in the tire width direction of the center main groove 12A and a second shoulder main groove 12C provided on the other side (left side in FIG. 1) WD2 in the tire width direction of the center main groove 12A. All these main grooves 12A, 12B and 12C are straight grooves extending over the entire circumference of the tire circumferential direction CD.

A plurality of land sections are demarcated in the tread section 10 in the tire width direction WD by the plural main grooves 12. In detail, a first center land section 14 sandwiched between the center main groove 12A and the first shoulder main groove 12B, a second center land section 16 sandwiched between the center main groove 12A and the second shoulder main groove 12C, a first shoulder land section 18 positioned on one side WD1 in the tire width direction of the first shoulder main groove 12B and a second shoulder land section 20 positioned on the other side WD2 in the tire width direction of the second shoulder main groove 12C are provided.

On the second center land section 16 and the second shoulder land section 20, a plurality of lateral grooves 22 and 24 extending in the tire width direction WD so as to cross respective land sections are provided at intervals in the tire circumferential direction CD. Accordingly, the second center land section 16 and the second shoulder land section 20 are formed as block lines in which a plurality of blocks 16A and 20A are arranged in the tire circumferential direction.

In the first shoulder land section 18, a plurality of lateral grooves 26 opening to a ground contact end, extending from the ground contact end in the tire width direction WD toward the tire equator CL and terminating inside the first shoulder land section 18 are provided at intervals in the tire circumferential direction CD. Accordingly, the first shoulder land section 18 is formed as a rib-like land section continuing over the entire circumference in the tire circumferential direction CD.

The present embodiment is characterized by the shape of the first center land section 14. The first shoulder land section 18, the second center land section 16 and the second shoulder land section 20 are not particularly limited, and various shapes of land sections can be adopted.

The first center land section 14 is a rib-like land section partitioned by the center main groove 12A and the first shoulder main groove 12B and extending in the tire circumferential direction CD, which continues over the entire circumference in the tire circumferential direction CD in this example.

A plurality of sub-grooves 28 with an L-shape in plan view each including a lateral groove portion 30 and a longitudinal groove portion 32 are provided in the first center land section 14 at given intervals in the tire circumferential direction CD. The sub-grooves 28 function as resonators. Therefore, the sub-grooves 28 are preferably arranged at intervals in which one or more sub-grooves 28 are constantly included inside the ground contact surface completely at the time of adding a normal load to the tire.

Figure 2:
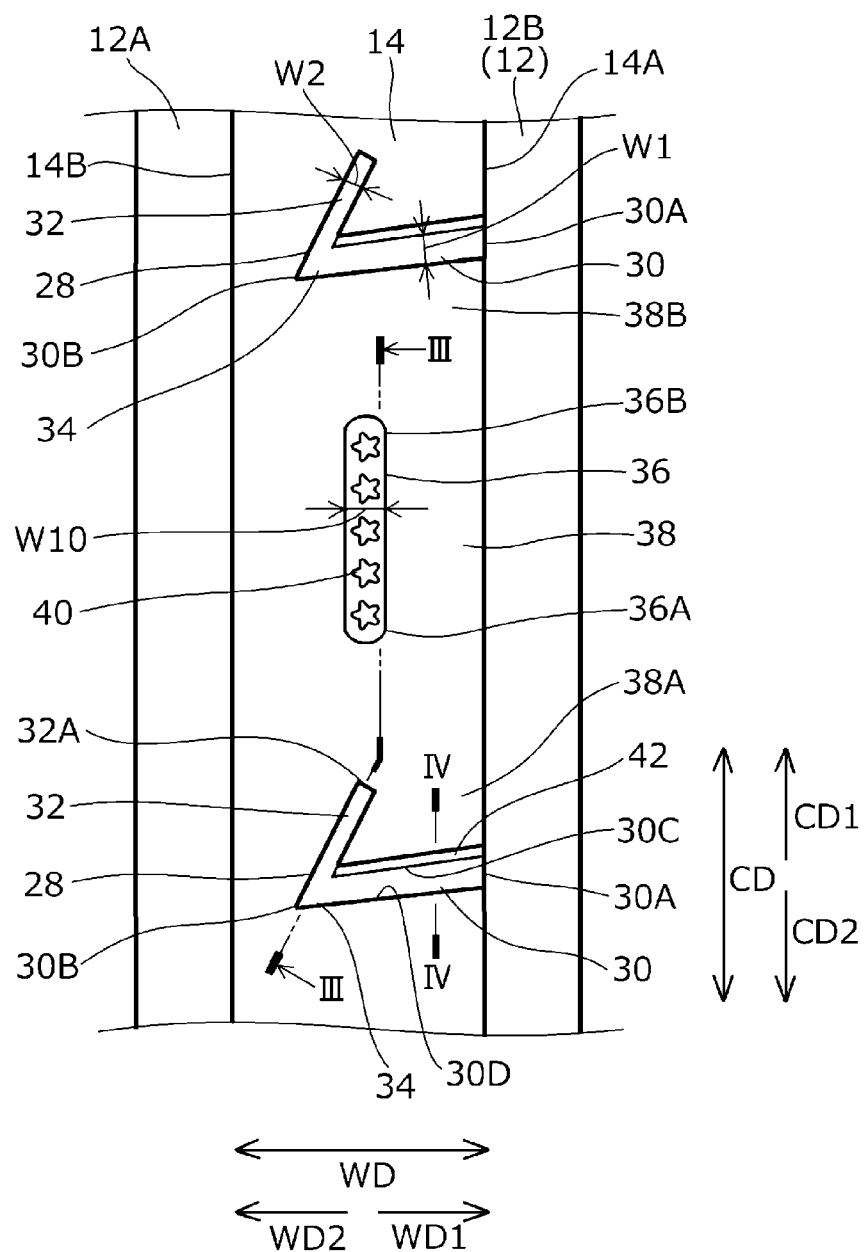
FIG. 2 is an enlarged view of a relevant part showing a first center land section of the tread pattern.

As shown in FIG. 2 in an enlarged manner, the lateral groove portion 30 is a groove portion extending in the tire width direction WD, in which one end 30A thereof opens to the first shoulder main groove 12B and the other end 30B terminates inside the first center land section 14. The lateral groove portion 30 may not necessarily be parallel to the tire width direction WD as long as the portion extends in the tire width direction WD, which may be inclined with respect to the tire width direction WD and is inclined in this example.

The lateral groove portion 30 extends across the width direction center of the first center land section 14 from one side wall 14A of the first center land section 14 (that is, a side wall facing the first shoulder main groove 12B) toward the other side WD2 in the tire width direction and terminates before reaching the other side wall 14B. Accordingly, the other end 30B of the lateral groove portion 30 is positioned off the center in the width direction of the first center land section 14 to the other side WD2 in the tire width direction.

The longitudinal groove portion 32 is a groove portion extending in the tire circumferential direction CD, extending in one side CD1 in the tire circumferential direction (an upper side in FIG. 1 and FIG. 2) from the other end 30B of the lateral groove portion 30 and terminates inside the first center land section 14. A tip end of the longitudinal groove portion 32 in the extending direction is called a terminal end 32A. As shown FIG. 1, all longitudinal groove portions 32 are provided so as to extend from the lateral groove portions 30 to the direction of one side CD1 in the tire circumferential direction in the plural sub-grooves 28 arranged side by side in the tire circumferential direction CD.

The longitudinal groove portion 32 may not necessarily be parallel to the tire circumferential direction CD as long as the portion extends in the tire circumferential direction CD, which may be inclined with respect to the tire circumferential direction CD and is inclined in this example. In detail, the longitudinal groove portion 32 extends in the tire circumferential direction CD while being inclined toward the one side WD1 in the tire width direction from the other end 30B of the lateral groove portion 30 positioned off the center in the width direction of the first center land section 14 to the other side WD2 in the tire width direction, and terminates at the central part in the width direction of the first center land section 14. Accordingly, the lateral groove portion 30 and the longitudinal groove portion 32 are connected through an acute-angled bending portion 34, therefore, the sub-groove 28 has an L-shape with the acute-angled bending portion 34 in plan view.

A groove depth D1 (see FIGS. 3 and 4) of the sub-groove 28 is not particularly limited but may be normally shallower than groove depths of the main grooves 12 (particularly that of the first shoulder main groove 12B), which is preferably, for example, 3 to 8 mm or 5 to 8 mm. It is preferable that the groove depth D1 of the sub-grooves 28 is constant, that is, it is preferable that the lateral groove portion 30 and the longitudinal groove portion 32 have the same groove depth.

A width of the sub-groove 28 is not particularly limited but may be smaller than the groove widths of main grooves 12 (particularly that of the first shoulder main groove 12B). For example, a groove width W1 in the lateral groove portion 30 (see FIG. 2) is preferably 1 to 8 mm or 3 to 5 mm, and a groove width W2 in the longitudinal groove portion 32 (see FIG. 2) is preferably 1 to 8 mm or 2 to 4 mm. The groove width W1 in the lateral groove portion 30 is set to be larger than the groove width W2 in the longitudinal groove portion 32.

Also in the first center land section 14, groove holes 36 extending in the tire circumferential direction CD are provided between the sub-grooves 28, 28 adjacent to each other in the tire circumferential direction CD. In detail, the first center land section 14 is partitioned into plural land section parts 38 sandwiched between plural sub-grooves 28 arranged side by side in the tire circumferential direction CD. One groove hole 36 is provided in each land section part 38 sandwiched between the sub-grooves 28, 28 adjacent to each other in the tire circumferential direction CD.

The groove hole 36 is a long hole, that is, a slot. In this example, the groove hole is a straight groove, and both ends terminate inside the first center land section 14 and do not open to the main groove 12. The groove hole 36 is arranged with a space from the longitudinal groove portion 32 of the sub-groove 28 in the tire circumferential direction CD. In detail, the groove hole 36 is arranged with a space in the tire circumferential direction CD from the longitudinal groove portion 32 in an end portion 38A on one side where the longitudinal groove portion 32 extends as well as with a space in the tire circumferential direction CD from the sub-groove 28 in an end portion 38B on the other side where the longitudinal groove portion 32 does not extend in each land section part 38. In this example, the groove hole 36 is arranged at an approximately intermediate position of sub-grooves 28, 28 on both sides in the tire circumferential direction CD.

The groove hole 36 is provided in parallel to the tire circumferential direction CD at the central part in the width direction of the first center land section 14. The groove hole 36 may not necessarily be parallel to the tire circumferential direction CD as long as the hole extends in the tire circumferential direction CD, which may be inclined with respect to the tire circumferential direction CD.

Concerning the groove depth on both end portions in the tire circumferential direction CD, the groove hole 36 is formed so that a groove depth D11 at one end part 36A close to the terminal end 32A of the longitudinal groove portion 32 becomes shallower than a groove depth D12 at the other end part 36B far from the terminal end 32A.

In the example, the groove hole 36 is formed so that the groove depth becomes shallower as coming close to one end part 36A facing to the terminal end 32A of the longitudinal groove portion 32. In detail, the groove depth D12 at the other end part 36B farthest from the terminal end 36A of the longitudinal groove portion 32 is the deepest, and the groove depth becomes shallower as coming close to the terminal end 32A. The groove depth D11 at the one end part 36A closest to the terminal end 32A is the shallowest. That is, the groove depth of the groove hole 36 becomes gradually shallower from the other end part 36B toward the one end part 36A. Accordingly, a bottom surface 36C of the groove hole 36 is formed in an inclined surface state.

The groove depth of the groove hole 36 is not particularly limited and, for example, the groove depth D11 at the one end part 36A is preferably 1 to 5 mm and the depth D12 at the other end part 36B is preferably 4 to 8 mm. A width W10 (see FIG. 2) of the groove hole 36 is also not particularly limited, which is preferably, for example, 1 to 8 mm or 3 to 5 mm.

Figure 3:
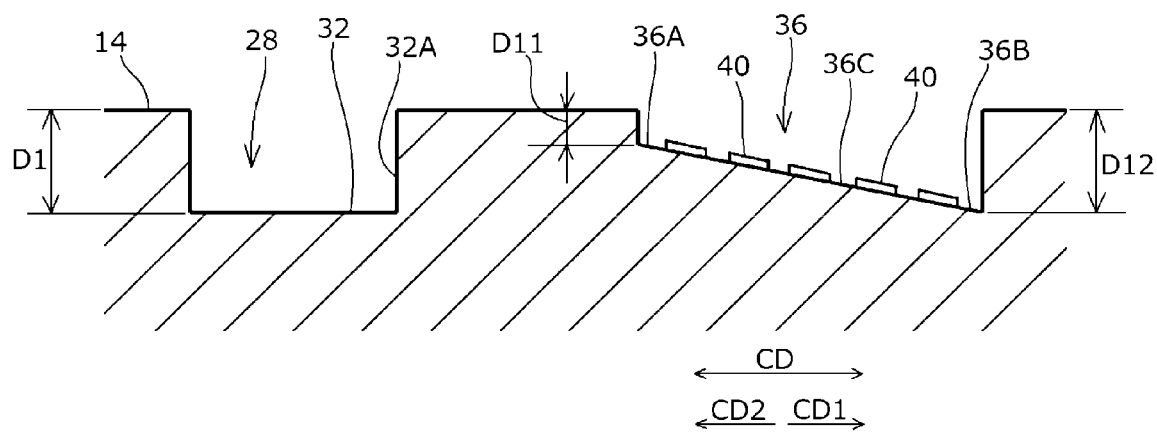
FIG. 3 is a cross-sectional view taken along III-III line of FIG. 2.

As shown in FIG. 3, a plurality of convex portion 40 are provided side by side in the tire circumferential direction CD on the bottom surface 36C of the groove hole 36. The convex portions 40 are provided for adding a function of checking on the progress in wear to the groove hole 36, and marks such as characters, symbols and figures are preferably formed in a convex shape. In this example, the convex portion 40 are star-shaped marks as shown in FIG. 2.

It is preferable that three or more convex portions 40 are provided side by side in the tire circumferential direction CD for increasing the function of checking on the progress in wear, and five convex portions 40 are provided at equal intervals in the tire circumferential direction CD in this example.

Figure 4:
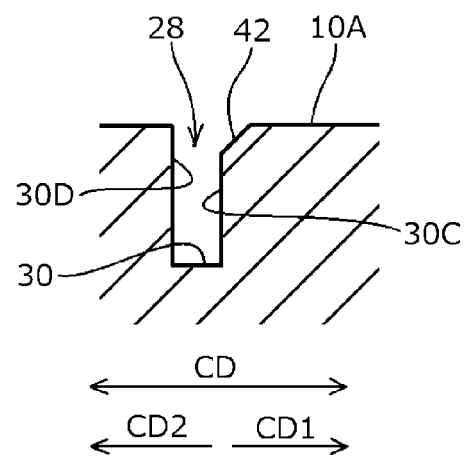
FIG. 4 is a cross-sectional view taken along IV-IV line of FIG. 2.

As shown in FIG. 2 and FIG. 4, the lateral groove portion 30 of the sub-groove 28 is provided with a chamfered portion 42. The chamfered portion 42 is provided in a side wall 30C on the one side CD1 in the tire circumferential direction CD as a side in which the longitudinal groove portion 32 extends in both side walls 30C and 30D of the lateral groove portion 30 so as to be inclined with respect to a tread surface 10A. The chamfered portion 42 is not provided in the side wall 30D on the other side CD2 in the tire circumferential direction.

That is, the chamfered portion 42 is provided along an inner edge portion of the L-shape of the sub-groove 28 making the L-shape, which is formed to have a shape in which an opening corner part is diagonally cut in the groove wall facing the lateral groove portion 30 in the end portion 38A on one side of the land section part 38. The chamfered portion 42 is provided over the entire side wall 30C of the lateral groove portion 30 in a length direction.

When adopting the pneumatic tire according to the embodiment configured as described above, the sub-grooves 28 each having the lateral groove portion 30 opening to the first shoulder main groove 12B and extending in the tire width direction WD and the longitudinal groove portion 32 communicating with the lateral groove portion 30 and extending in the tire circumferential direction CD are provided, thereby reducing columnar resonance sound of the pneumatic tire.

In detail, the columnar resonance sound of the tire is generated when the tread section 10 having the main groove 12B extending in the tire circumferential direction CD contacts the road surface to thereby form a tube (space) having the same length as a ground contact length between groove walls of the main groove 12B and the ground surface, and compression and release of air inside the tube are repeated while running of the tire. As such sub-grooves 28 branching from the main groove 12B are provided, the sub-grooves 28 function as resonators and the frequency of the columnar resonance sound can be dispersed, as a result, the columnar resonance sound can be reduced.

Moreover, the groove holes 36 extending in the tire circumferential direction CD are provided between sub-grooves 28, 28 adjacent to each other in the tire circumferential direction CD are provided, and the groove depth of the groove hole 36 is formed so as to be shallower on the terminal end 32A side of the longitudinal groove portion 32, thereby reducing the difference in rigidity caused by extension of the longitudinal groove portion 32.

In detail, if the groove hole 36 is not provided in the land section part 38 sandwiched between the sub-grooves 28, 28, the rigidity is smaller in the end portion 38A on one side in the tire circumferential direction where the longitudinal groove portion 32 of the sub-groove 28 extends than in the end portion 38B on the other side where the longitudinal groove portion 32 does not extend. On the other hand, when the groove hole 36 having the groove depths described above is provided, the rigidity in the end portion 38B on the other side can be reduced while suppressing reduction in rigidity in the end portion 38A on one side, therefore, the difference in rigidity between the end portion 38A on one side and the end portion 38B on the other side can be reduced. As the difference in rigidity between both end portions 38A and 38B of the land section part 38 is reduced as described above, heel-and-toe wear in the rotation of the tire can be reduced.

Furthermore, the volume of grooves on the tread surface is increased by providing the groove holes 36, which leads to improvement of draining performance. Additionally, by provision of the groove holes 36, the difference in rigidity in the land section parts 38 can be reduced by providing the sub-grooves 28 as described above, therefore, the sub-grooves 28 can be formed deeper as compared with related art, which can improve draining performance due to increase of the volume of groove also from this point of view.

According to the present embodiment, the plural convex portions 40 are arranged side by side in the tire circumferential direction CD on the bottom surface 36C of the groove hole 36, thereby adding the function of checking on the progress in wear to the groove hole 36.

It is also preferable to arrange concave portions side by side instead of the plural convex portions 40 on the bottom surface 36C of the groove hole 36, which can add the function of checking on the progress in wear in the same manner. When a plurality of groove holes 36 are provided, it is not always necessary to provide these convex portions 40 or the concave portions in all groove holes 36, and both the groove hole having the function of checking on the progress in wear and groove hole not having the function may be provided in one rib-like land section.

According to the present embodiment, the chamfered portion 42 is provided in the side surface 30C on the side where the longitudinal groove portion 32 extends in both side walls 30C and 30D of the lateral groove portion 30 of the sub-groove 28, thereby increasing the rigidity in the end portion 38A on one side where the rigidity is reduced due to extension of the longitudinal groove portion 32. Accordingly, the difference in rigidity between the end portion 38A on one side and the end portion 38B on the other side in the land section part 38 can be further reduced and the reduction effect of heel-and-toe wear can be further increased.

Although the sub-grooves 28 functioning as resonators are provided only in one rib-like land section 14, the similar sub-groove 28 functioning as resonators may be provided in a plurality of rib-like land sections.

Also in the above embodiment, the groove holes 36 are respectively provided in all land section parts 38 each sandwiched between the sub-grooves 28, 28 adjacent to each other in the tire circumferential direction CD, however, it is not always necessary to provide the groove holes 36 in all land section parts 38 but the groove holes 36 may be provided in only part of land section parts 38.

Although sipes are not provided in the rib-like land section 14 in which the sub-grooves 28 and the groove holes 36 are provided in the above embodiment, it is also preferable to provide sipes in the rib-like land section 14 with the sub-grooves 28 and the groove holes 36. Here, sipes are cuts normally having a minute groove width of 1 mm or less, which are grooves in which openings to the road surface are closed when the pneumatic tire fitted to a normal rim and filled with a normal internal pressure is made to contact on the road surface and a normal load is added. As an example, it is preferable that sipes are provided so as to extend from the other end 30B of the lateral groove portion 30 to communicate with the center main groove 12A. As the sipes are closed at the time of contacting the ground as described above, operation and effect according to the embodiment are not impaired even when the sipes are provided so as to communicate with the center main grooves 12A side as described above.

Respective dimensions in the specification are in a normal state with no load in which the pneumatic tire is fitted to the normal rim and is filled with the normal internal pressure. The normal rim will be a "standard rim" in JATMA standard, "Design Rim" in TRA standard or "Measuring Rim" in ETRTO standard. The normal internal pressure will be "the maximum air pressure" in JATMA standard, "the maximum value" written in "TIRE LOAD LIMITS AT VARIOUS COLD INFLATION PRESSURES" in TRA standard, or "INFLATION PRESSURE" in ETRTO standard.

As the pneumatic tire according to the embodiment, tires for various types of vehicles, for example, a tire for a passenger car and tires for a heavy load such as for a truck, a bus and light trucks (for example, a SUV vehicle and a pickup truck) can be cited.

Some embodiments have been explained above, and these embodiment are cited as examples and do not intend to limit the scope of the invention. These embodiments may be achieved in other various manners, and various kinds of omission, replacement and alterations may occur within a scope not departing from the gist of the invention. These embodiments and modifications thereof are included in claims or the gist thereof as well as included in the inventions described in claims and the range of equivalency of the claims.

What is claimed is:

1. A pneumatic tire comprising:
a main groove provided in a tread section and extending in a tire circumferential direction;
a rib-like land section partitioned by the main groove and extending in the tire circumferential direction;
a plurality of sub-grooves provided in the rib-like land section at intervals in the tire circumferential direction; and
a groove hole provided between the sub-grooves adjacent to each other in the tire circumferential direction and extending in the tire circumferential direction, wherein
each of the plurality of sub-grooves includes a lateral groove portion extending in a tire width direction, in which one end opens to the main groove and the other end terminates inside the rib-like land section, and a longitudinal groove portion extending from the other end of the lateral groove portion to one side in the tire circumferential direction and terminating inside the rib-like land section,
the groove hole is formed so that a groove depth at one end part close to a terminal end of the longitudinal groove portion becomes shallower than a groove depth at the other end part far from the terminal end,
a plurality of convex portions or concave portions are arranged side by side in the tire circumferential direction on a bottom surface of the groove hole,
the bottom surface of the groove hole is formed in an inclined surface shape so that the groove depth of the groove hole becomes gradually shallower from the other end part toward the one end part, and
the groove holes are provided such that only one groove hole is provided in each land section part sandwiched between the sub-grooves adjacent to each other in the tire circumferential direction.

2. A pneumatic tire comprising:
a main groove provided in a tread section and extending in a tire circumferential direction;
a rib-like land section partitioned by the main groove and extending in the tire circumferential direction;
a plurality of sub-grooves provided in the rib-like land section at intervals in the tire circumferential direction; and
a groove hole provided between the sub-grooves adjacent to each other in the tire circumferential direction and extending in the tire circumferential direction, wherein
each of the plurality of sub-grooves includes a lateral groove portion extending in a tire width direction, in which one end opens to the main groove and the other end terminates inside the rib-like land section, and a longitudinal groove portion extending from the other end of the lateral groove portion to one side in the tire circumferential direction and terminating inside the rib-like land section,
the groove hole is formed so that a groove depth at one end part close to a terminal end of the longitudinal groove portion becomes shallower than a groove depth at the other end part far from the terminal end,
a plurality of marks are provided side by side in the tire circumferential direction on the bottom surface of the groove hole,
the bottom surface of the groove hole is formed in an inclined surface shape so that the groove depth of the groove hole becomes gradually shallower from the other end part toward the one end part, and the groove holes are provided such that only one groove hole is provided in each land section part sandwiched between the sub-grooves adjacent to each other in the tire circumferential direction.

\* \* \* \* \*